(12) United States Patent
Magaldi et al.

(10) Patent No.: US 11,143,435 B2
(45) Date of Patent: Oct. 12, 2021

(54) HIGH ENERGY-EFFICIENT DEVICE, SYSTEM AND METHOD FOR THE USE OF THERMAL ENERGY OF SOLAR ORIGIN

(71) Applicant: MAGALDI POWER S.P.A., Rome (IT)

(72) Inventors: Mario Magaldi, Salerno (IT); Riccardo Chirone, Naples (IT); Piero Salatino, Naples (IT); Paola Ammendola, Rome (IT); Roberto Solimene, Rome (IT)

(73) Assignee: MAGALDI POWER S.P.A., Rome (IT)

( * ) Notice: Subject to any disclaimer, the term of this patent is extended or adjusted under 35 U.S.C. 154(b) by 200 days.

(21) Appl. No.: 16/477,341

(22) PCT Filed: Jan. 31, 2018

(86) PCT No.: PCT/IB2018/050590
§ 371 (c)(1),
(2) Date: Jul. 11, 2019

(87) PCT Pub. No.: WO2018/142292
PCT Pub. Date: Aug. 9, 2018

(65) Prior Publication Data
US 2019/0360724 A1    Nov. 28, 2019

(30) Foreign Application Priority Data

Feb. 1, 2017   (IT) .......................... 102017000010774
Feb. 1, 2017   (IT) .......................... 102017000010806

(51) Int. Cl.
*F24S 10/30*      (2018.01)
*F28D 13/00*      (2006.01)
(Continued)

(52) U.S. Cl.
CPC ............... *F24S 10/30* (2018.05); *F24S 20/20* (2018.05); *F24S 80/20* (2018.05); *F28D 13/00* (2013.01); *F24S 60/00* (2018.05)

(58) Field of Classification Search
CPC ........... F28D 13/00; F28D 19/02; F24S 60/00
See application file for complete search history.

(56) References Cited

U.S. PATENT DOCUMENTS 3,437,073 A * 4/1969 Drake ..................... A23P 20/18
                                                          118/24
4,002,438 A * 1/1977 Fleming ................. B01J 8/1854
                                                          48/76
(Continued)

FOREIGN PATENT DOCUMENTS

AT          408845 B  * 3/2002
CN      103423887 A  * 12/2013
(Continued)

OTHER PUBLICATIONS

Koenigsdorff et al., "Results of and prospects for research on direct-absorption fluidized bed solar receivers", Solar Energy Materials, 1991, vol. 24, No. 1/4, pp. 279-283.
(Continued)

*Primary Examiner* — Jorge A Pereiro
(74) *Attorney, Agent, or Firm* — Lucas & Mercanti, LLP (57) ABSTRACT

A device for accumulation and exchange of thermal energy of solar origin is provided. The device includes: a casing which defines an internal compartment and has an irradiation opening configured to allow the entry of concentrated solar radiation, the opening puts in direct communication the inner compartment with the external environment being devoid, in use, of closure or screen means; a bed of fluidizable solid particles, received within the inner compartment of the casing, the bed has an operative region directly exposed to the concentrated solar radiation that enters (Continued)

through the opening, in such a way that the particles of the operative region absorb thermal energy from solar radiation; and fluidization means of the bed of particles, configured to adduce a fluidizing gas into the compartment at the operative region.

21 Claims, 8 Drawing Sheets (51) Int. Cl.
*F24S 60/00* (2018.01)
*F24S 20/20* (2018.01)
*F24S 80/20* (2018.01)

(56) References Cited

U.S. PATENT DOCUMENTS

| | | | | |
|---|---|---|---|---|
| 4,704,138 | A * | 11/1987 | Smith | C10J 3/12 201/12 |
| 4,726,913 | A * | 2/1988 | Brophy | B01J 8/245 252/373 |
| 4,767,569 | A * | 8/1988 | Brophy | C01B 3/44 252/373 |
| 4,777,934 | A * | 10/1988 | De Laquil, III | F03G 6/064 126/678 |
| 4,828,486 | A * | 5/1989 | Sakamoto | B01J 8/26 122/4 D |
| 7,947,326 | B1 * | 5/2011 | Marshall | B01J 2/006 427/213 |
| 8,109,265 | B1 * | 2/2012 | Kolb | F24S 20/20 126/684 |
| 8,313,704 | B2 | 11/2012 | Ogawa et al. | |
| 2003/0157247 | A1 * | 8/2003 | Chikami | B01J 2/006 427/212 |
| 2008/0095850 | A1 * | 4/2008 | Ho | A61K 9/1652 424/489 |
| 2012/0111777 | A1 * | 5/2012 | Roberts | B01D 24/4673 210/87 |
| 2014/0102912 | A1 * | 4/2014 | Palumbo | C01B 3/063 205/340 |
| 2015/0090251 | A1 * | 4/2015 | Magaldi | F24S 20/20 126/714 |
| 2016/0076792 | A1 * | 3/2016 | Magaldi | G02B 17/002 126/714 |
| 2017/0145324 | A1 * | 5/2017 | Kodama | B01J 8/0257 |
| 2017/0191697 | A1 * | 7/2017 | Xiao | F28D 20/003 |
| 2018/0119993 | A1 * | 5/2018 | De Riccardis | F24S 70/10 |
| 2018/0224163 | A1 * | 8/2018 | Arjomandi | F24S 60/00 |
| 2018/0230973 | A1 * | 8/2018 | Magaldi | F03G 6/06 |
| 2020/0103145 | A1 * | 4/2020 | Ho | F24S 10/60 |

FOREIGN PATENT DOCUMENTS

| | | | |
|---|---|---|---|
| EP | 0104282 A1 | 4/1984 | |
| WO | 2008153922 A1 | 12/2008 | |
| WO | 2011027309 A2 | 3/2011 | |
| WO | WO-2012120016 A1 * | 9/2012 | F24S 23/79 |
| WO | 2013150347 A1 | 10/2013 | |
| WO | 2014038553 A1 | 3/2014 | |
| WO | 2016170485 A1 | 10/2016 | |
| WO | 2017021832 A1 | 2/2017 | |
| WO | 2017024338 A1 | 2/2017 | |

OTHER PUBLICATIONS

International Search Report and Written Opinion for Corresponding International Application No. PCT/IB2018/050590 (20 Pages) (dated Apr. 10, 2018).
European Communication Corresponding to European Patent Application No. 18703641.3 dated Apr. 30, 2021 (10 pages).

* cited by examiner

HIGH ENERGY-EFFICIENT DEVICE, SYSTEM AND METHOD FOR THE USE OF THERMAL ENERGY OF SOLAR ORIGIN

CROSS-REFERENCE TO RELATED APPLICATIONS

This application is a 371 of PCT/IB2018/050590, filed Jan. 31, 2018 which claims the benefit of Italian Patent Application No. 102017000010774, filed Feb. 1, 2017 and Italian Patent Application No. 102017000010806, filed Feb. 1, 2017.

FIELD OF THE INVENTION

This invention refers to a device for the accumulation and exchange of thermal energy of solar origin based upon a fluidizable bed of particles directly irradiated by concentrated solar radiation.

The invention also pertains to a system of production of energy which includes such a device and to a related method.

BACKGROUND

It is known how to collect solar energy by means of heliostats which concentrate the radiation on reflector mirrors. The latter, in turn, convey the radiation onto devices for thermal accumulation and exchange based upon fluidized bed of particles.

Systems for the production of thermal/electric energy, which comprise one or more units depending upon the thermal power that is to be obtained, can be based upon said devices for accumulation and exchange of thermal energy of solar origin.

The fluidized bed devices of the prior art are made according to two main constructions.

According to a first structure, discloses in WO2013/150347A1, the solar radiation is received upon the walls of a metal cavity of the device. Such a cavity defines part of the casing of the bed of particles and extends within the latter. The fluidized bed of particles takes from the walls of the cavity the thermal energy deriving from the solar radiation concentrated upon them.

In presence of high incident radiation flows, the structure that has just been described has the inconvenience of exposing the surface of the cavity to high temperatures and thermal gradients, with consequent criticality in terms of thermo-mechanical resistance and durability deriving from the quality of the metal alloy used. In order to distribute the thermal flows that the cavity walls are exposed to in a uniform way, the heliostat field can be organized in a plurality of subsections arranged around the device. However, this configuration requires a greater use of land for each solar generation unit when compared to a single heliostat field positioned in the direction of highest irradiation.

In a second known structure, the aforementioned cavity is not provided for and the bed of particles of the accumulation and exchange device receives the concentrated solar radiation through a window of transparent material, typically quartz, obtained on the casing of the device.

However, a criticality of such second structure consists in the fact that direct contact of the transparent window with the fluidized solid must be avoided, in order to limit the occurrence, over time, of phenomena of soiling, deposit of dusts and/or opacification of the transparent surface that reduce its efficiency of reception, resulting, among other things, in an increase in temperature and the creation of thermal gradients on the window.

A further disadvantage relating to the use of receivers of the type that has just been described, relates to the difficulty of producing quartz windows of adequate size for the requirements of an industrial-size system. In particular, to an increase in the plan size of the window must correspond, for assuring structural support, an increase in its thickness, with a corresponding decrease in radiation transmission property.

It is furthermore highlighted that the known devices can present criticalities in terms of maintenance and efficacy and efficiency of the thermal absorption and transfer process. In addition, known devices may also have important thermal losses due to a radiation re-emission towards the external environment.

As a consequence of what was stated above, the devices for accumulation and release of thermal energy of solar origin known in the art have, in certain cases, a sum of inefficiencies which do not allow for a competitive industrial use.

Energy or thermal production plants can be based upon the known devices described above. Such devices can be part of units for accumulation and/or exchange of thermal energy. The number of such units, and therefore of the devices, depends upon the thermal power to be achieved. Due to the inconveniences mentioned above, such units and the associated plants may have high energy production costs far from the so-called "parity grid".

SUMMARY OF THE INVENTION

The technical problem posed and solved by the present invention is therefore that of providing a device for accumulation and supply of thermal energy of solar origin that allows overcoming the aforementioned inconveniences of the prior art.

This problem is solved by a device according to claim 1.

The invention also provides a system according to claim 28 and a method according to claim 31.

Preferred features of the present invention are the subject of dependent claims.

The invention provides a device for the reception, accumulation and supply of thermal energy of solar origin based upon a fluidized bed of particles. The latter is irradiated, i.e. hit, in a direct manner by the concentrated solar radiation, without the interposition of receiving means such as, for example, cavities or transparent windows. In other words, the fluidized bed is in direct communication with the external environment by means of an irradiation opening obtained in a casing of the device, preferably at an upper part of the casing and, even more preferably, in a lateral position.

Therefore, the device of the invention, during use, does not provide for any transparent window, or any other structure, placed between the external environment/the incident solar radiation and the bed of particles.

When compared with the indirect irradiation devices of the prior art, the device of the invention allows for the direct transfer of the incident radiation power to the fluidized solid without the interposition of walls or other barriers. Therefore, the device allows limiting the thermal leaks through the irradiation opening. It follows that the maximal achievable temperature, which is limited exclusively by the properties of the fluidized solid, is higher than that which can be tolerated in the known systems with indirect irradiation, with a noticeable increase of the thermal performance/yield of the device.

The absence of windows, wall cavities or other barriers contributes to provide the device of the invention with greater sturdiness and durability.

Advantageously, the device is associated with an optical system, the latter comprising, in particular, primary heliostats and secondary reflectors, for example mirrors. This optical system concentrates the solar radiation upon the device, through the irradiation opening, upon an operative, or irradiation, region of the bed of particles.

In a preferred configuration, the irradiation of the device takes place from above in an oblique direction with respect to the ground (or to the vertical) and it is obtained by means of an optical system made of a field of heliostats positioned in the direction of greater irradiation, associated to a secondary reflector positioned in altitude, whose focus corresponds to the aforementioned irradiation opening.

The device of the invention typically comprises, or is associated with, heat exchange elements immersed in the granular bed. These elements may include tube bundles or membraned walls, wherein preferably an operating fluid flows through at least in selected stages of operation of the device.

In a preferred embodiment, the exchange elements inside the bed of particles are easily replaceable without the need to remove the bed particles. The replacement of the heat exchange elements can become necessary to maintain or adapt them to accept operating fluids of a different kind (for example, $CO_2$ in supercritical state).

According to an aspect of the invention, an operative, or irradiation, region of the bed of particles directly irradiated by the incident solar radiation can be fluidized according to a specific fluid-dynamic regime, preferably obtained by means of a fluidization system, in particular an adduction and/or distribution system, typically air. Said system is preferably arranged at the base of the bed of particles.

As stated above, the fluidization can affect an operating region of the bed directly exposed to the incident radiation, or the entire bed of particles or selected portions of it.

In specific embodiments, the preferred fluidization regimen is of a boiling bed type. The fluidization of the entire bed of particles allows to effectively homogenize the temperature of the bed, and this occurs by continuously replacing the particles hit by the solar radiation, that is concentrated in the area corresponding to the irradiation region, with other particles from adjacent regions, with a continuous recirculation of the bed particles between more internal regions and directly irradiated regions.

Therefore, the exchange of the bed particles at the irradiation opening, i.e. of those particles that are directly exposed to the solar radiation, and a supply and distribution of the thermal energy to the remaining part of the bed, is permitted thanks to the fluid-dynamic regimen established by the fluidization system.

Advantageously, the fluidization is associated with convective motion within the bed which allows for the movement of the particles affected by the concentrated solar radiation towards the adjacent regions of the bed and the attraction of new particles to the area corresponding to the irradiated region.

Advantageously, the means of adduction and/or distribution of the fluidization gas which make up said fluidization system can be inspected from the outside of the device, without the need to remove the bed particles, and, where required, undergo maintenance/cleaning, working from the outside. In this manner, for the inspection or maintenance of the device, it is not always necessary to stop operation of the device, wait for the cooling of the bed particles (typically amounting to many tons of material) and empty the device, particularly when the aforementioned means of adduction/distribution are positioned at the base of the bed.

According to specific operation modes of the device, the fluidization air emerges from the bed of particles in an upper region that is inside a casing of the device, which region is called freeboard.

In a preferred embodiment, a dedicated ventilation, or suction, system is provided that is connected to the internal environment of the device at with the aforementioned freeboard. This ventilation system operates a continuous suction of the emerging fluidization air, preferably resulting in a (slight) depression when compared to the outside environment.

Downstream a possible dust-removal stage, this air can pass through a heat exchanger, typically outside the device, and release its thermal content, for example, to another operating fluid. This thermal content therefore becomes usable for various purposes, such as, for example, for the desalination process of the water in a dedicated system. More preferably, the fluidization air exiting from the device, by means of a specific exchanger, can preheat ambient air that is subsequently introduced in the bed of particles by the aforementioned fluidization system. On the basis of a further variant, the ventilation system can result in a re-introduction of the air drawn from the freeboard directly into the bed of particles, in particular at the base of the same, for the purpose of fluidization of the same bed.

Due to the thermo-fluid dynamic properties of the bed, the greater the speed of the particles, in particular as induced by the fluidization air flow, the greater the coefficient of heat exchange that results within the bed itself. For this reason and in order to avoid that dust and hot air can escape from the device through the irradiation opening, a particularly preferred configuration of the device provides for a synergy between the position of said opening, the configuration of the casing in the region that bounds the freeboard and/or the pressure in the freeboard.

On the basis of a preferred configuration, the irradiation opening is positioned laterally on the casing of the device, typically at, or in proximity of, its summit. In particular, the position of the opening is lateral to a main fluidization direction of the bed of particles and/or to a longitudinal direction of extension of the bed. Preferably, the part of the casing that bounds the freeboard, which is typically an upper wall of the casing itself, has a sloping, or hooded, configuration, with a lower edge or part at the irradiation opening. Advantageously, at or in proximity to an upper edge or part of said sloping configuration, a connection to the ventilation system is positioned which draws the fluidization air emerging in the freeboard. In this manner, the relevant part of the casing works as a hood, favoring the convective motion of the hot fluidization air exiting from the bed of particles towards the connection to the ventilation system, with said air preferably being drawn by the depression brought about by the suction action of said system. The hot air is therefore moved away from the irradiation opening.

In a preferred arrangement, the choice of the position of the irradiation opening is such that it limits to a minimum the view factor of the bed portion that is directly irradiated by the concentrated solar radiation. In particular, preferably, no portion of the bed of particles is in direct correspondence with the irradiation opening according to the vertical or longitudinal direction, that is to say does not present a unitary view factor with respect to the opening itself. This configuration allows to limit to a minimum the losses of heat due to re-irradiation generated by the superficial portion of the bed of particles and it also reduces the risk of escape of air and dust.

On the basis of a preferred embodiment, the ventilation system is configured to increase the suction speed as the temperature of the bed of particles increases. This automation allows to maintain a constant, or anyhow controlled, depression in the freeboard region.

In any case, as stated above, the ventilation system can result in an internal pressure of the device equal or lower to that of the surrounding environment, in order to reduce or eliminate the escape of hot air and eventual dust towards the environment outside the device.

In the case of depression of the freeboard region with respect to the outside environment, outside air can enter the device through the irradiation opening. Such entry of outside air can counter the escape of fluidization air and of dust through the same opening.

According to another aspect of the invention, at the irradiation opening an auxiliary heat exchanger can be positioned, either completely or partially outside of the casing. Such an auxiliary heat exchanger can receive the concentrated solar radiation directly, in particular at an operating fluid that passes through it. The auxiliary exchanger can be independent of the exchangers that are inserted in the bed of particles and can immediately make the enthalpy content acquired by the solar radiation available for various purposes, for example, to continuously power a desalination system associated with the device. In other applications, the auxiliary exchanger can be connected to the exchangers that are inside the bed of particles and carry out a preheating of the related operating fluid.

The heat exchanger can be housed within a guidance means—for example having a truncated conical shape tapered towards the outside—positioned at the irradiation opening. Such a variant contributes to the preheating of the ambient air that can enter the device through the irradiation opening.

Additional embodiments may provide for a plurality of irradiation openings, each having the features mentioned above.

The device of the invention can be part of a modular system for the production of solar powered thermal energy.

Other advantages, characteristics and usage modalities of the invention will be evident from the following detailed description of certain embodiments, which are presented as examples but with no limiting effect.

BRIEF DESCRIPTION OF THE FIGURES

Reference will be made to the drawings of the attached figures, in which.

The linear and angular dimensions or quote shown in the figures introduced above are to be understood merely as an example and they are not necessarily represented in proportion.

DETAILED DESCRIPTION OF PREFERRED EMBODIMENTS

Various embodiments and variants of the invention will be described below, with reference to the figures introduced above.

Generally speaking, analogous components are indicated in all the various figures using the same reference number.

Embodiments and further variants other than the embodiments and variants already dealt with in the description will be illustrated solely with respect to the differences with what was already described.

Moreover, the features of the various embodiments and variants described below are to be understood as combinable, where compatible.

Figure 1:
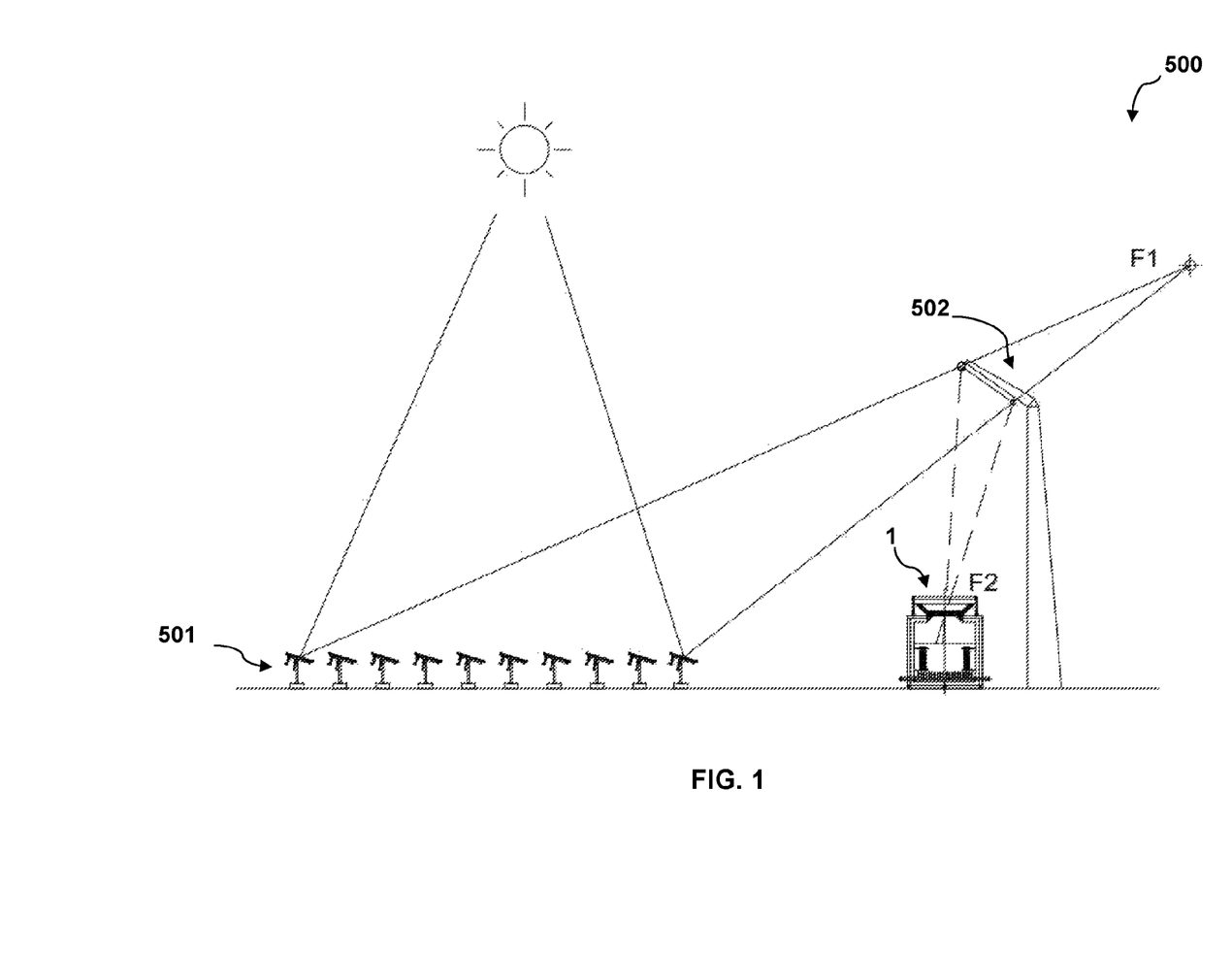
FIG. 1 shows a schematic view, in longitudinal section, of a device for accumulation and exchange of thermal energy of solar origin according to a first preferred embodiment of the invention, associated with an optical system of the so-called "beam down" type.

With reference to FIG. 1, a device for accumulation and exchange of thermal energy of solar origin, or receiver, according to a first preferred embodiment of the invention is denoted as a whole by reference number 1.

The device 1 of the present embodiment is conceived to be inserted in an energy production system 500, eventually comprising a plurality of devices such as the one considered here.

The system 500 can include an optical system that is configured to concentrate an incident solar radiation upon the device(s) 1. Each device 1 can be associated with an optical system of its own. Advantageously, such an optical system has a "beam down" configuration. In particular, the optical system can include a plurality of primary heliostats 501, or equivalent primary optical elements, arranged on the ground and suitable to collect the solar radiation to deviate/concentrate it upon one or more secondary reflectors 502, or equivalent secondary optical elements. The latter are arranged at a raised height, above the device or devices 1 arranged on the ground, and they therefore convey the solar radiation on the device(s) itself/themselves. In FIG. 1, a common focus of the optical elements is indicated with F1 and the focus of the secondary optical element that is represented is indicated with F2.

The primary heliostats 501 can be organized in subfields, for example arranged according to cardinal points.

As shown in greater detail in FIG. 2, the device 1 comprises a containment casing 2, which defines an internal compartment 20, the latter being suitable to host a fluidizable bed of particles 3 which will be described shortly. The casing 2 can have a polygonal geometry, for example a cubic, a parallelepipedal or a cylindrical geometry. In this example, the casing 2 includes an upper wall 21, a lateral skirt 23 and a lower wall or base 24.

With respect to the geometry of the device 1, we can define a longitudinal direction L, in the present example a vertical direction, and a transversal direction T, which is orthogonal to the longitudinal direction L and in this example, therefore, horizontal.

The casing 2 has an irradiation opening 10. The secondary reflectors 502 cited above specifically concentrate the incident solar radiation into said opening 10, or at or in proximity to it (focus F2), and within the compartment 20.

The opening 10 places the internal compartment 20, and thus the bed of particles 3 that it houses, in direct communication with the external environment. In particular, the opening 10, during use, does not have any closure or screen means such as, for example, transparent windows or the like. In other words, the device 1 is configured to operate without any closure or screening means. During non-operative periods, the opening can be closed using removable means meant to protect the system and to eliminate or reduce the outward dispersion of thermal energy to the outside environment.

In this example, the opening 10 is shown as being arranged at the upper wall 21 of the casing 2 and generally centered in a longitudinal sense with respect to it. Such a representation is however to be understood as purely exemplary and a particularly preferred arrangement of said opening 10 will be discussed later with reference to FIG. 4.

The bed of fluidizable particles 3 is of a granular type, i.e. formed by solid particles. The type of granular material that is preferred for the bed of particles of the device 1 is one having high conductivity and diffusivity thermal characteristics. An example of preferred granular material is river sand, which, beyond having suitable thermal characteristics, features a naturally-rounded form of the particles that minimizes the phenomenon of mutual abrasion between the same.

The bed 3 occupies the internal compartment 20 in such a way to leave, also during use, a vacant space 22, or freeboard, above its own free surface 35. In particular, the space 22 is bounded at the bottom by the free surface 35, at the top by the wall 21 of the casing 2 and laterally by the skirt 23 of the casing itself.

The bed 3 defines a first bed region 30, the free surface of which is arranged in such a way to be directly irradiated, which is to say impacted/hit, by the solar radiation that enters through the irradiation opening 10. Said first region 30 will be called operative, or irradiation, region. The remaining part of the bed, surrounding and adjacent to the operating region 30, defines a heat accumulation region 31.

In general terms, in the example taken into consideration here, the operative region 30 is arranged longitudinally centered in the bed 3 and the accumulation region 31 circumscribes it and is transversally adjacent to it.

Embodiment variants can provide that the operating region, which is to say the region that is directly irradiated, occupies the entire extension of the bed 3.

The bed of particles 3 is activated by fluidization means 4 configured to adduct and distribute a fluidization gas, in particular, air, inside the compartment 20. In this embodiment, the fluidization means 4 comprise a plurality of elements of adduction or inlet of fluidization air, arranged at the lower base 24 of the casing 2 or of the bed of particles 3. The path of the fluidization air inside the bed of particles 3 is therefore from bottom to top, in particular vertical or substantially vertical. In more general terms, the introduction of the fluidization gas takes place following the longitudinal direction L.

In this example, such adduction elements are arranged—and therefore adduct air—both at a base of the accumulation region 31 and at a base of the operating region 30. In FIG. 2, an adduction element arranged at the operating region 30 is indicated with reference number 40.

In this example, a uniform or substantially uniform fluidization of the bed of particles 3, which is to say of its two regions 30 and 31, is provided.

The fluid-dynamic regimen of the bed 3 allows for an effective exchange of heat between the particles of its various parts, in particular between those of the operating region 30 and those of the accumulation region 31. This process is favored by the fact that the bed particles, in particular those belonging to the two regions, undergo a continuous exchange and recirculation. During use, the particles of the operating region 30, and in particular those arranged on the free surface 35 or in its proximity, absorb thermal energy from the solar radiation and they transfer it to the other bed particles, in particular to those of the accumulation region 31.

As previously mentioned, the heat exchange between the particles is favored by convective motions determined by the fluidization regimen. These motions transfer, or pour, in the upper part of the adjacent subregions of the bed, the particles of the subregion having greater fluidization speed into the adjacent subregion with lower fluidization speed and draw particles of this latter subregion within the subregion having greater speed into the lower part of the adjacent subregions.

This remixing of the subregion particles allows for a transfer of mass and thermal energy within the entire volume of the operative region of the bed affected by the solar spot and maximizes the surface of particles exposed to the concentrated solar radiation.

Embodiment variants can provide a differentiated fluidization, eventually the fluidization of only one of the regions 30 and 31 and/or a temporally differentiated fluidization of the regions. The fluidization of different regions or portions of beds, or the fluidization regimens that can be selected for them, can be different for the speed, and eventually the capacity or flow rate, of the fluidization air flow entering the bed of particles 3.

The fluidization elements can be uniformly arranged at the base of the bed of particles 3, as shown in this example, or they can be positioned in a differentiated manner.

Moreover, fluidization elements that are structurally analogous to one another and eventually controlled in different ways, for example in terms of speed and/or capacity/flow rate, can be provided.

The fluidization regimen can also be of the boiling type and/or, in general, a regime that favors convective motions of particles in the bed 3 or in regions or portions of the same.

In certain embodiment variants, the fluidization regimen that is selected for the entire bed or for one of its regions or portions can also be of the so-called "spouted" type, for example a jet, fountain or impulse. The fluidized bed of the spouted type generally has a hydrodynamic regimen characterised by a central gas fluidization jet at the base of the bed itself which, due to the strong difference in speed between the particles that are directly exposed to the jet and the surrounding particles, establishes a motion drawn by part of the bed column that insists upon the jet itself as well as the facing (cylindrical) regions, creating, as said, a fountain effect in the central part fed by the solid that is drawn in the lateral parts of the jets.

Advantageously, the aforementioned adduction elements of the fluidization gas can be inspected from outside of the device, without the need to remove the bed particles, and, where required, they can undergo maintenance/cleaning working from the outside.

In the example taken into consideration here, the fluidization system comprises one or more distribution conduits 45 of the fluidization air, horizontally arranged at the base of the device 1 and preferably positioned to pass through the device at its lateral skirt or wall 23. At the external side of the device 1, each conduit 45 can, for example, be provided with a removable flange 46. In this way, should it be necessary, it is sufficient to simply remove the aforementioned flange 46 in order to be able to inspect and access the internal part of the conduit 45.

Heat exchange elements 5, in particular tube bundles, can be housed within the bed 3, in particular within the accumulation region 31. Said tube bundles, under selected operating conditions, which is to say under certain use conditions, can be traversed by an operating fluid, for example water in its liquid and/or vapor state.

In particular, in a heat exchange stage, i.e. in a stage of use of the retained thermal energy, the operating fluid can be made to flow in the tube bundles 5 and receive heat from the particles of the accumulation region 31. On the contrary, during an accumulation-only stage, the tube bundles 5 can operate in dry condition, i.e. without operating fluid.

In a preferred application modality, the accumulation stage can be activated in the presence of sunlight. The thermal exchange, i.e. the transfer of thermal energy to the operating fluid, can be activated also in the absence of sunlight.

The fluidization of the bed of particles 3, or of one of its (sub)regions or portions, can also take place solely during the accumulation stage.

The heat exchange elements 5 can be configured in such a way to be readily replaceable without the need to remove the bed particles.

Figure 3:
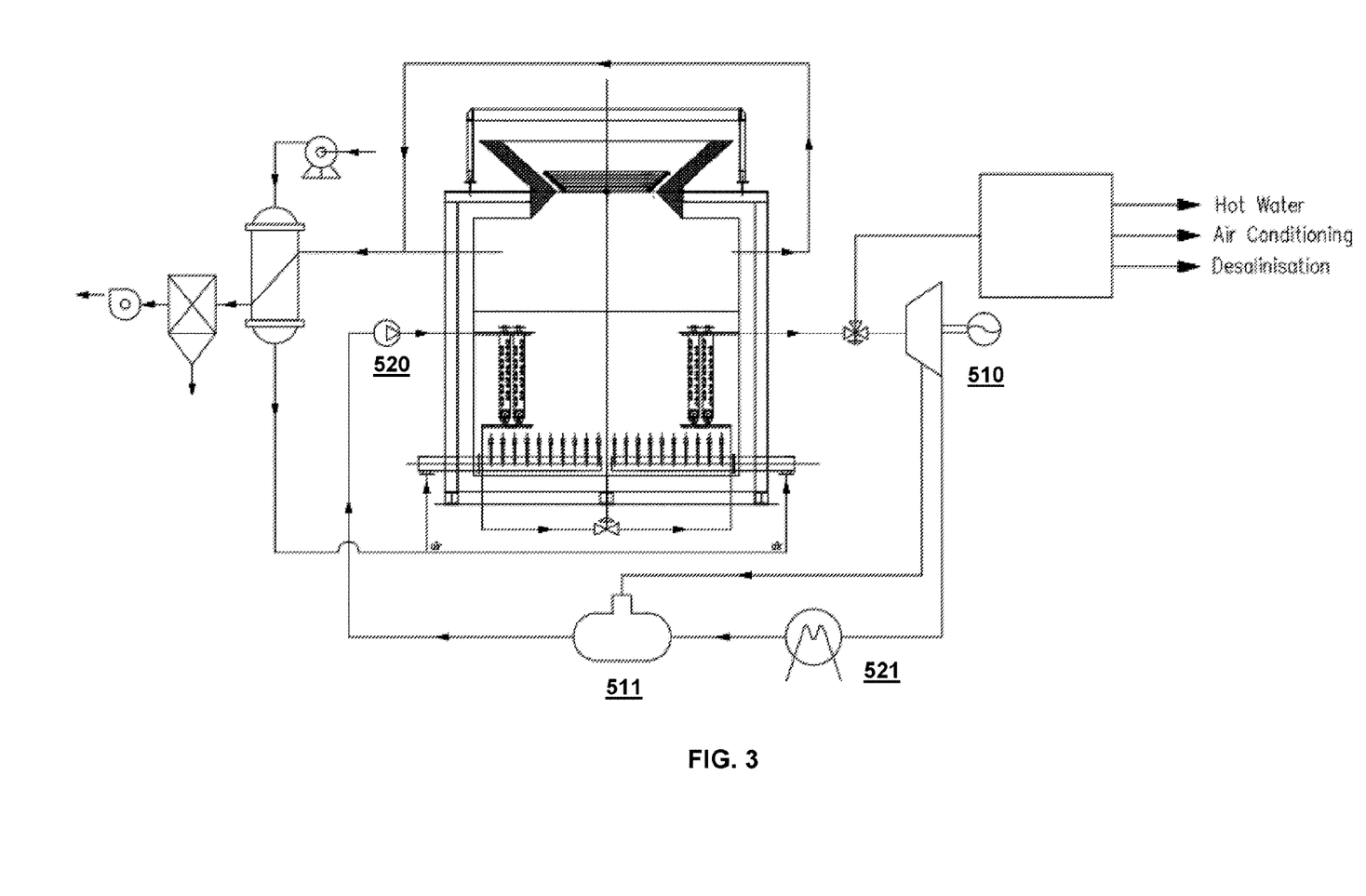
FIG. 3 shows another enlarged schematic representation of the device of FIG. 1, including in association with certain components of an energy production system.

As shown in FIG. 3, the operating fluid exiting from the device 1 under the nominal temperature and pressure conditions can be made to expand in a turbine 510 coupled to a generator for the production of electric energy or it can be used for other industrial purposes, for example for the production of hot water, in air conditioning systems or in desalination systems. In other words, the tube bundles 5 are linked to further components of the system 500, for example one or a plurality of turbines 510, condensers 511, heat exchangers 521, pumps 520 and so forth, each one of which is per se known.

Figure 2:
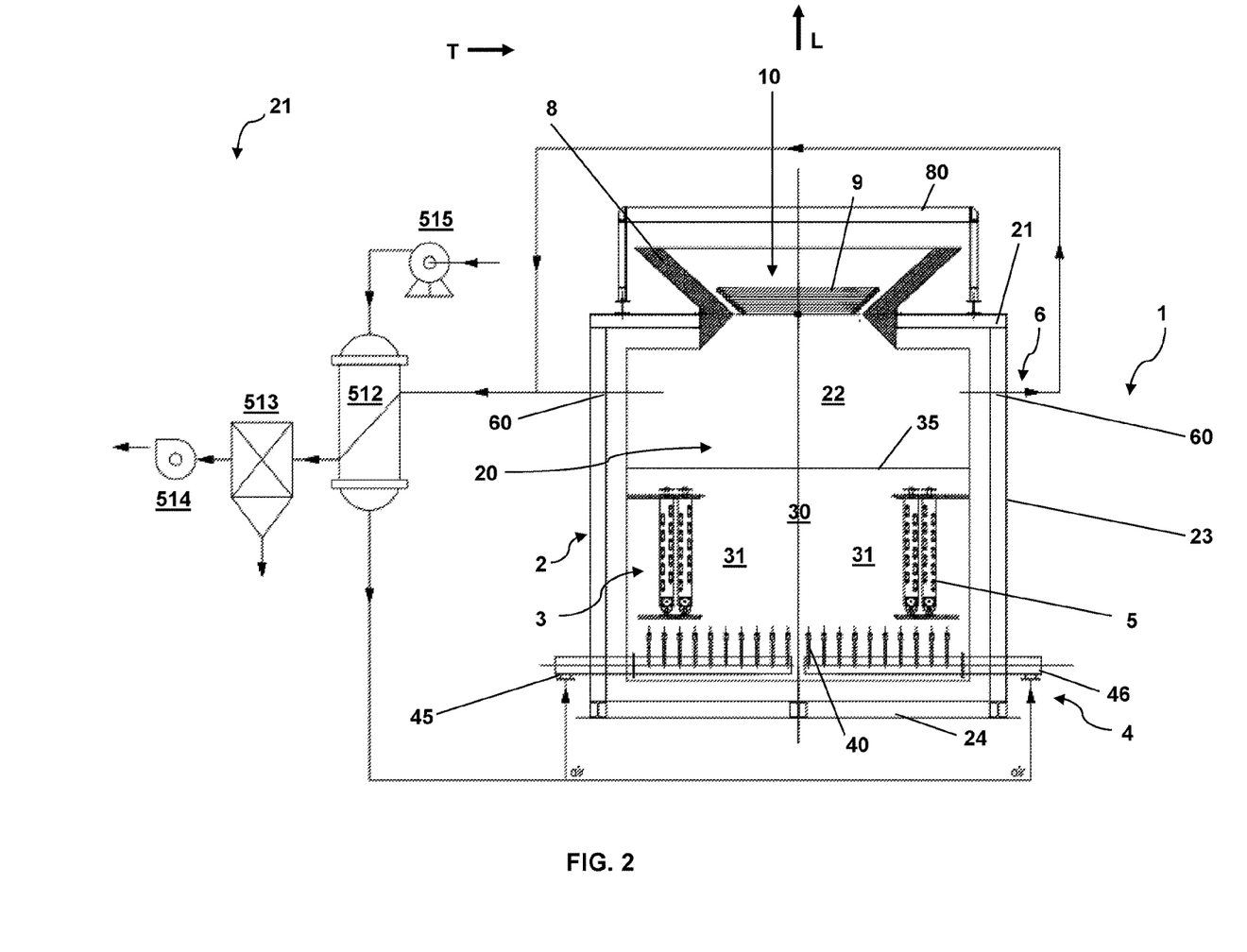
FIG. 2 shows an enlarged schematic embodiment of the device of FIG. 1, in association with certain components of a thermal exchange system.

Still with reference to FIGS. 2 and 3, the device 1 moreover comprises means 6 for the suction of the fluidization air which ended its own path inside the bed of particles 3 and emerges from it at the freeboard 22. Such suction means 6 are therefore configured to suction the air within the casing 2 above the free surface 35 of the bed of particles 3. In this example, the suction means 6 comprise outlet elements 60 of the air from the vacant space 22 arranged at an upper portion of the lateral skirt 23 of the casing 2.

Preferably, the suction means 6 are also configured to avoid an introduction, or a massive introduction, of fluidization air and/or of the particles carried along by it in the external environment through the opening 10.

Advantageously, the suction means 6 have control means (not represented), preferably flow rate sensors, which, in synergy with further means of control (not illustrated) which are associated with the fluidization means 4, result in an air flow rate extracted from the device 1 which is equal or greater to the flow rate of fluidization air introduced in the bed of particles 3.

Preferably, the configuration of the suction means 6 is such that it determines a depression in the space 22. In this case, the suction means 6 determine a return of air from the environment into the device through the inlet opening 10. This air warms up during the passage through the inlet opening 10, enriching itself of thermal content that is provided to the air extracted from the device 1.

Advantageously, the device 1 provides an exchange of heat between the (heated) fluidization air exiting from the bed of particles 3 at the free surface 35 of the latter and suctioned by the means 6 and the fluidization air entering the bed of particles 3 by means of the fluidization means 4. In other words, a regeneration of the heat is provided, obtained through the heat exchange means. This is schematically represented in the figures by means of heat exchange components 512, fluidization air dust removal components 513, ventilation components 514, components for the suction of the fluidization air from the device 515 and for the introduction of the ambient air to the into the fluidization system.

In an embodiment variant, the device 1 has a plenum chamber at the free surface 35 of the bed of particles 3. This plenum chamber is understood as being a zone with low or no speed for the bed particles and it is defined, in this example, by the vacant space 22.

Even the plenum chamber 22 contributes to avoid an escape, or a massive escape, of air and/or particles through the opening 10.

In an embodiment variant, the device 1 can furthermore comprise means of introduction of a confinement gas, in particular air, in the form of a laminar flow. The latter is suitable to produce a (further) barrier to the escape of particles to the outside.

Said means can be arranged above the free surface 35 of the bed of particles 3, in particular at the irradiation opening 10. Preferably, the arrangement is such that the laminar flow is emitted specifically in line with the opening 10, parallel to the transversal direction T of development of the latter, to form a sort of gaseous window of closure of the opening.

In this embodiment, the device 1, moreover, comprises a shaped confinement structure 8, or guide, arranged at mouth of the irradiation opening 10. The confinement structure 8 can completely or mainly develop outside the device 1, which is to say protrude or not partially within the vacant space 22.

The confinement structure 8 has a pass through opening, which is to say it has a tubular structure, in such a way to maintain the direct communication between the inside and the outside of the casing 2 by means of the irradiation opening 10.

In an embodiment variant, the confinement structure 8 results in a (further) plenum chamber and therefore contributes to avoid or reduce the escape of air and/or particles to the outside.

In this embodiment, the confinement structure 8 has a tapered shape, in particular conical, with a decreasing section towards the inside of the casing 2. Said section of the confinement structure allows for the avoidance of interference with the direction of the solar radiation that is concentrated by the dedicated optical system.

Moreover, at the walls of structure 8, air suction nozzles, or equivalent suction elements, can be made, which can be in communication with the environment of the freeboard 22 or be associated with a dedicated suction system. When in communication with the freeboard 22, these nozzles pour the suctioned air into the space comprised between the free surface 35 and the upper wall 21 of the casing 2. From here, this air flow is also suctioned by the suction means 6 that have already been introduced.

In an embodiment variant, the device 1 furthermore comprises an external frame 80 which supports removable means at the opening 10, for the protection of the system during its non-operative periods and such to eliminate or decrease the dispersion of thermal energy to the outside environment.

According to a preferred embodiment, the device 1 comprises an auxiliary heat exchanger 9, arranged at the confinement structure 8 or, in general terms, of the irradiation opening 10. The auxiliary exchanger 9 is configured in such a way to be directly exposed to the incident solar radiation, in order to absorb heat, for example, by means of a fluid vector.

The auxiliary exchanger 9 can be independent from the heat exchange elements 5 introduced in the bed of particles or it can be connected to them.

Figure 4:
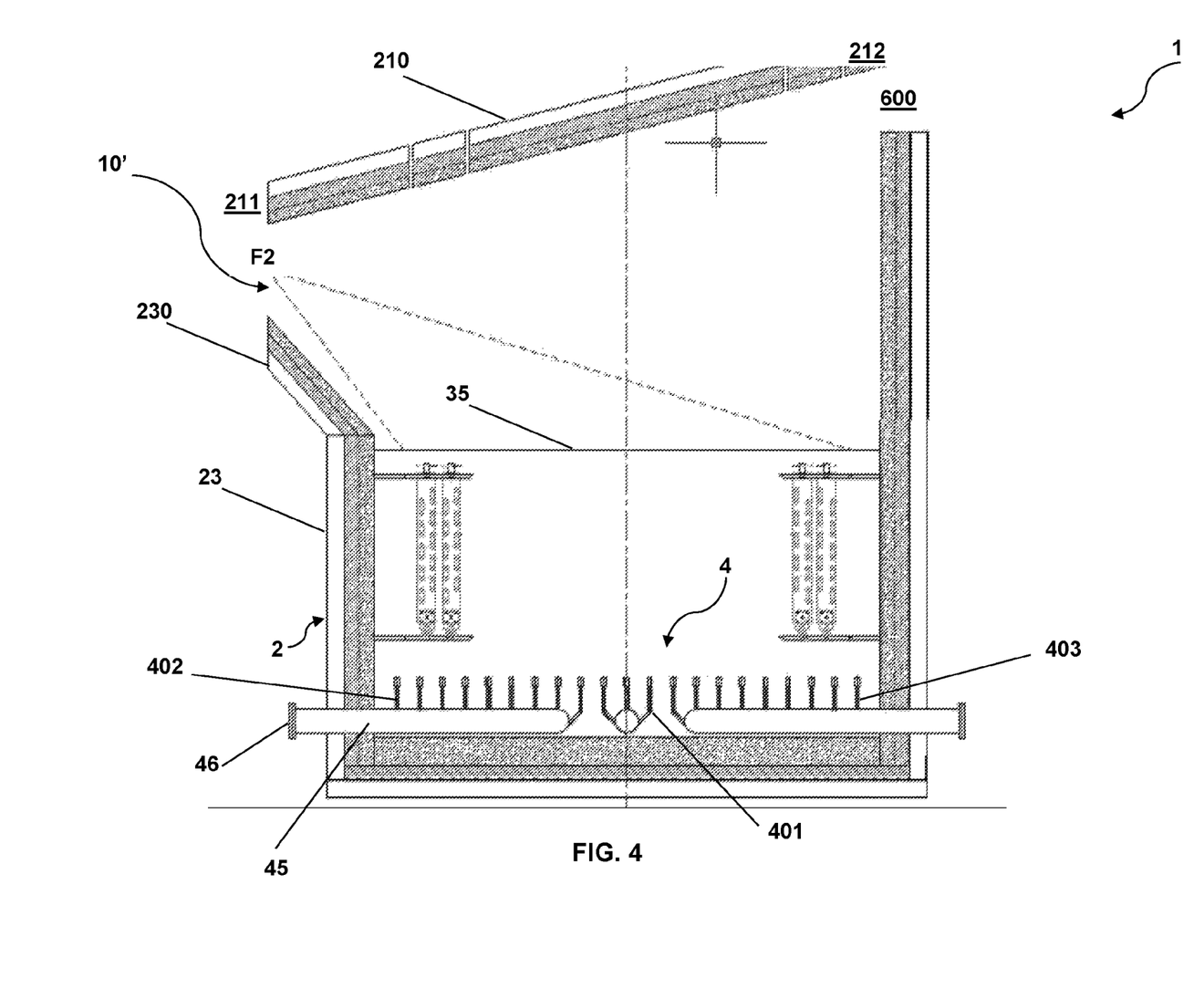
FIG. 4 shows a schematic longitudinal section view of a device for accumulation and exchange of thermal energy of solar origin according to another more preferred embodiment of the invention, which can be combined with the system components and the elements of the preceding figures.

FIG. 4 refers to a particularly preferred embodiment of the device of the invention, also indicated here with 1. Although it is represented schematically, the same description as above applies for this embodiment, with the exception of the positioning of the irradiation opening, indicated here with reference 10', which is laterally arranged on the casing 2. In particular, the opening 10' is made in line with an upper part of the casing 2 and defined, in this example, between a portion 230 of the lateral skirt 23 of the casing and an upper wall, in particular a sloped one, 210 of the casing 2 itself. In this example, the portion 230 has an incline when compared to the remaining part of the skirt 23, and in particular when compared to the transversal and longitudinal directions T and L, protruding outwardly when compared to said remaining skirt part. Preferably, the free surface 35 of the bed of particles 3 is arranged, in fluidization operating conditions, at or in proximity of the lower edge of the portion 230, in particular below it.

The sloped or hooded upper wall 210 has a lower edge 211 that together with the portion 230 results in the opening 10', and an upper margin 212 that is connected to an element or outlet port 600 of the suction or ventilation means 6 described above.

The focus F2 of the secondary optical element 502 mentioned in reference to FIG. 1 falls at the mouth of the opening 10'.

As already highlighted above, the lateral position of the opening 10', the sloped configuration 210 of the casing 2 and/or the pressure regimen in the freeboard 22 as (also) obtained by means of the suction means 6 are synergistic to improve the thermal exchange in the bed of particles 3 and to avoid the escape of dust and hot air from the device 1.

In FIG. 4 fluidization means 4 analogous to those described above are shown, made of one or a plurality of central adduction elements 401 which can be independent from one or more lateral elements 402 and 403. These elements can also be inspected and/or maintained from the outside, for example, by means of one or more removable flanges 46 which are analogous to those previously described.

FIG. 4 furthermore highlights a multilayer structure for the casing 2.

Figure 5:
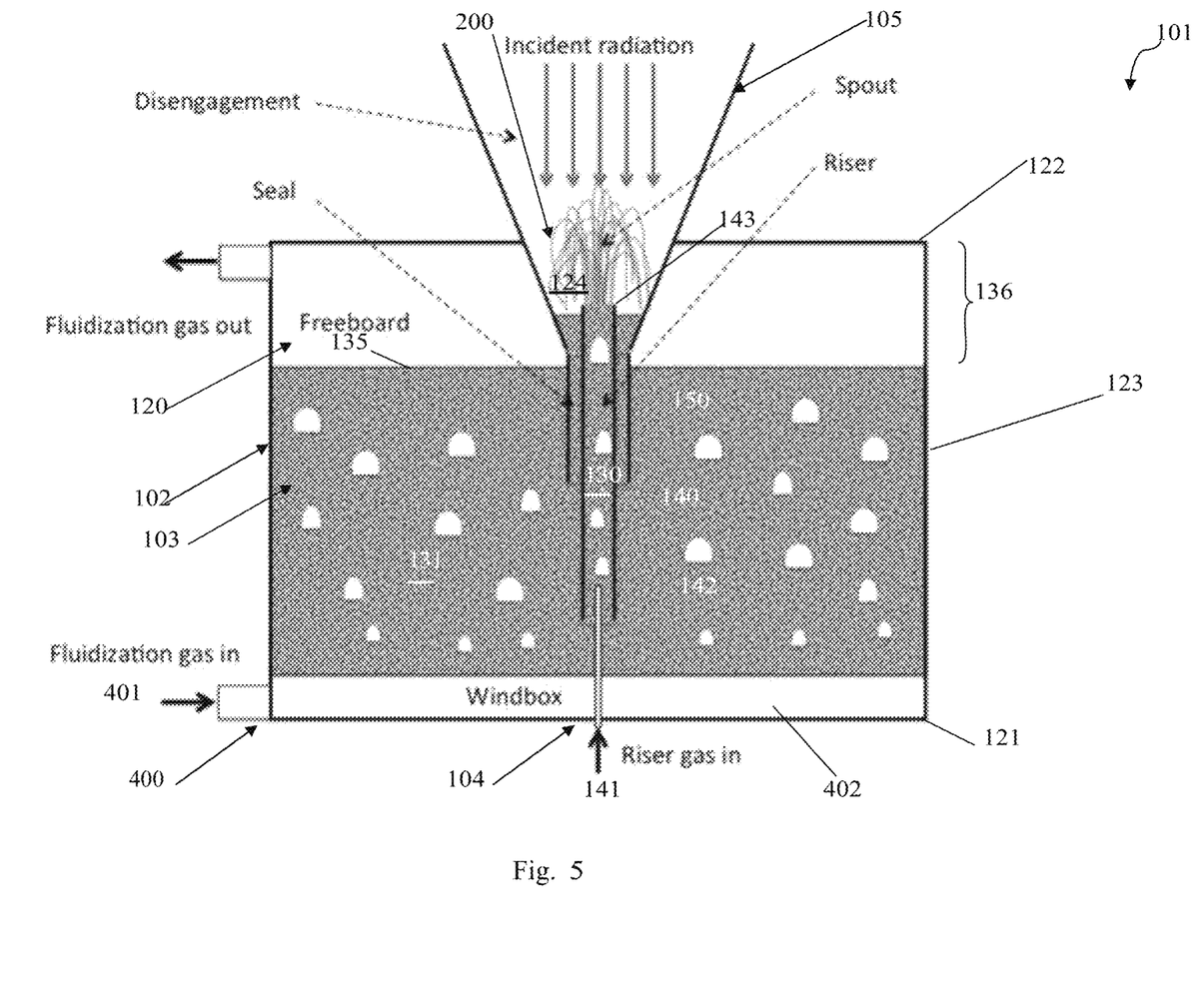
FIG. 5 shows a schematic view, in longitudinal section, of a device for accumulation and exchange of thermal energy of solar origin according to another preferred embodiment of the invention.

FIG. 5 shows another preferred embodiment of a device for the storage and/or exchange of thermal energy of solar origin which is indicated as a whole with 101.

The device 101 is suitable for use in an energy production plant, in particular an electric one, and configured to receive a solar radiation concentrated by an optical system.

The device 101 includes an outer casing 102, having a lower base 121, an upper wall 122 and a lateral skirt 123. The casing has an internal compartment 120, in direct communication with the external environment at an irradiation opening 200. The latter is positioned, in this example, in the center of the upper wall 122.

Also in this case, the opening 200 is configured to allow the entry of the concentrated solar radiation and, as stated, puts in direct communication said internal compartment 120 with the external environment being devoid, in use, of closure or screen means.

A bed of fluidizable solid particles is received within the compartment 120, indicated as a whole with the number 103 and analogous to the one described above in conjunction with the other embodiments.

With reference to the operating modalities of the device 101—and analogously to the preceding embodiments—within the bed of particles 103, in use, one can identify an irradiation, or operative, portion 130, directly exposed to the concentrated solar radiation which enters through the opening 200, and a portion of heat storage and/or exchange 131, arranged circumscribed to the irradiation portion 130. In this embodiment, the irradiation portion 130 is placed centrally with respect to the storage and/or exchange portion 131. The two portions 130 and 131 each extend in longitudinal direction L within the bed of particles, which is to say, between the base 121 and the upper wall 122. The free surface (freeboard) of bed 103, indicated with 135, is, in general, positioned below the upper wall 122 of the casing 102, as it is separated from the latter by a free space 136.

The two bed portions 130 and 131 are in dynamic communication of particles, in the sense that, in use, the particles of the two portions are exchanged, undergoing continuous mixing. Even the extension of the freeboard 136 may be variable as a function of the specific application.

At the base of the bed of particles 103, or of the casing 102, first and second fluidization means are provided, indicated as a whole with numbers 104 and 400 and configured in such a way to determine a fluidization of the bed 103 and, in particular, its respective portions 130 and 131.

In greater detail, the first fluidization means 104 include an element 141 for conveyance of air or other fluidization gas, positioned centrally in such a way to correspond to a base of the irradiation portion 130.

The first fluidization means 104 then include an ascending conduit ("riser") 140, which extends longitudinally inside bed 103, presenting, in particular, a first portion 142 in proximity of the base of the bed and a second portion 143 placed above the free surface 135. The ascending conduit 140 is configured to receive in its inside the particles of the irradiation portion 130 and to guide them up to a bubbling or eruption above the free surface 135 and at the irradiation opening 200.

The second fluidization means 400 also include an element 401 for conveyance of air or of other fluidization gas, positioned laterally to the base of the casing 102. This element 401 conveys the gas inside a windbox 402, which distributes it to the base of the storage and/or exchange portion 131.

Preferably, the fluidization means 104 and/or 400 are configured to determine, in use, a regime of boiling bed in the entire bed of particles 103 or in its portions or subportions.

Figure 6:
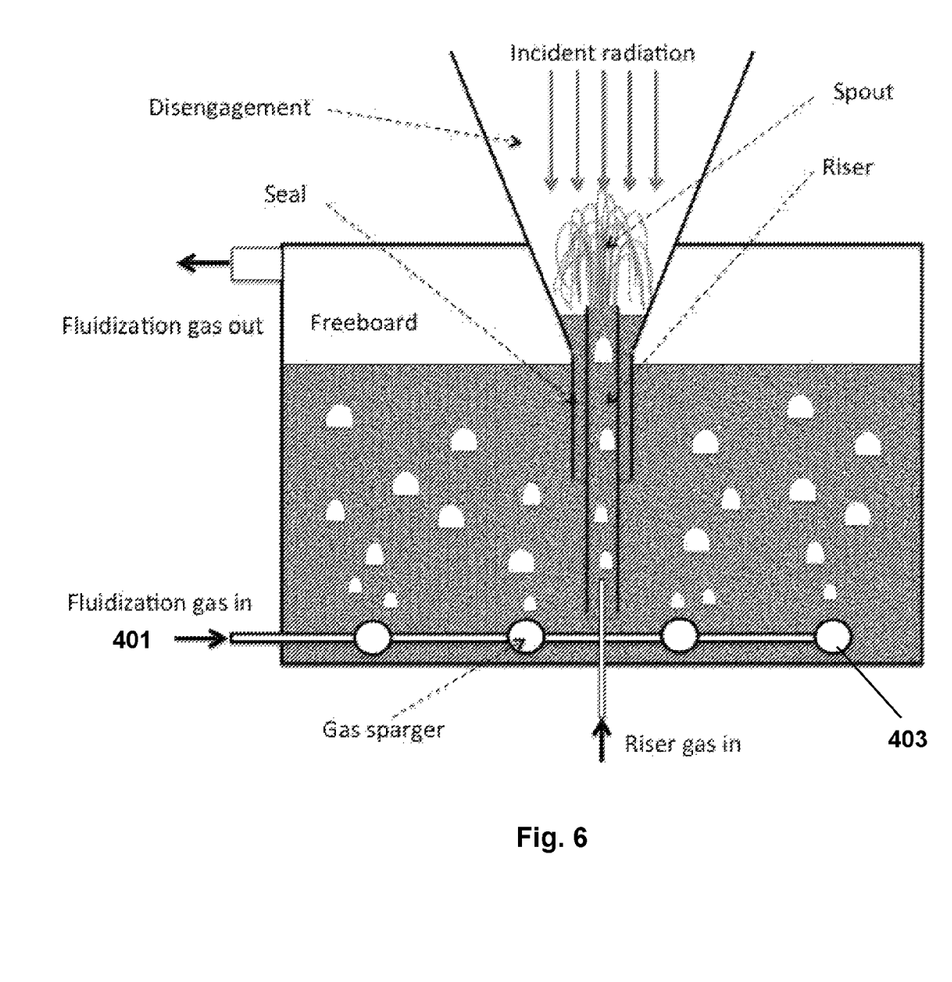
FIG. 6 shows a schematic view, in longitudinal section, of a device for accumulation and exchange of thermal energy of solar origin according to another preferred embodiment of the invention relating to an alternative mode of distribution of a fluidization gas.

In an embodiment variant shown in FIG. 6, the second fluidization means include a plurality of distribution elements ("spargers"), one of which is indicated as an example with 403.

Again, with reference to FIG. 5, the device 101 furthermore includes a confinement structure 105, integral to the casing 102 and positioned at the irradiation opening 200 in such a way to completely circumscribe it.

The confinement structure 105 cooperates with the first fluidization means 104 in order to determine a dynamic exchange of particles between the two bed portions 130 and 131. For this purpose, the structure 105 is arranged circumscribed to the ascending conduit 140.

In this embodiment, the confinement structure 105 presents a geometry that varies from the bottom to the top, or that is tapered, with a section that decreases in size towards the inside of the casing 102, in particular an inverted truncated cone shape. The lower base of said truncated cone continues with a descending conduit 150 positioned circumscribed to the ascending conduit 140 and which extends inside the bed of particles. Preferably, the confinement structure 105 is arranged at least partly projecting outwardly with respect to said irradiation opening 200.

The overall configuration is such that the particles of the irradiation portion 130, downstream of said bubbling or eruption, fall back between the ascending conduit 140 and the confinement structure 105 and they are guided by the descending conduit 150 in a motion of re-admission into the portion of heat storage and/or exchange 131

The longitudinal compartment defined within the bed 103 between the two conduits 140 and 150 establishes a hydraulic seal as regards the outflow of the particles and of the fluidization gas adducted by the second means 400 towards the outside of the device 101 through the opening 200.

Therefore, in use, the particles of the irradiation portion 130 absorb thermal energy from the solar radiation during their bubbling or eruption and transfer it to the particles of said portion of storage and/or exchange 131 once they are guided through the descending conduit 150.

Preferably, the confinement structure 105 defines, above the free surface 135 of the bed 103, a plenum chamber 124 of the fluidization motion of the particles of the irradiation portion 130.

Advantageously, therefore, the first and second fluidization means 104 and 400 are configured to determine different fluid-dynamic regimens in the irradiation portion 130 when compared to the portion 131, preferably based on different particle fluidization speeds.

The device shown in FIG. 6 is completely analogous to that of FIG. 5, apart from the previously mentioned variant in the second fluidization means.

Figure 7:
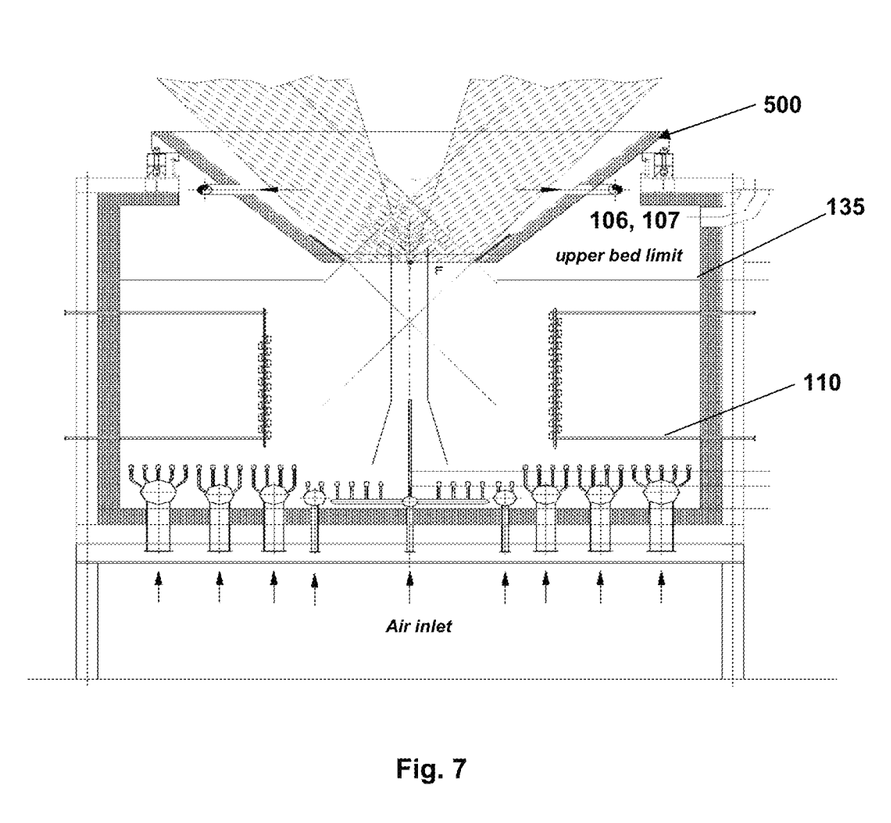
FIG. 7 shows a schematic view, in longitudinal section, of a device for accumulation and exchange of thermal energy of solar origin according to another preferred embodiment of the invention, which highlights a barriering method for avoiding particle escape from a freeboard of the fluidized bed.
Figure 8:
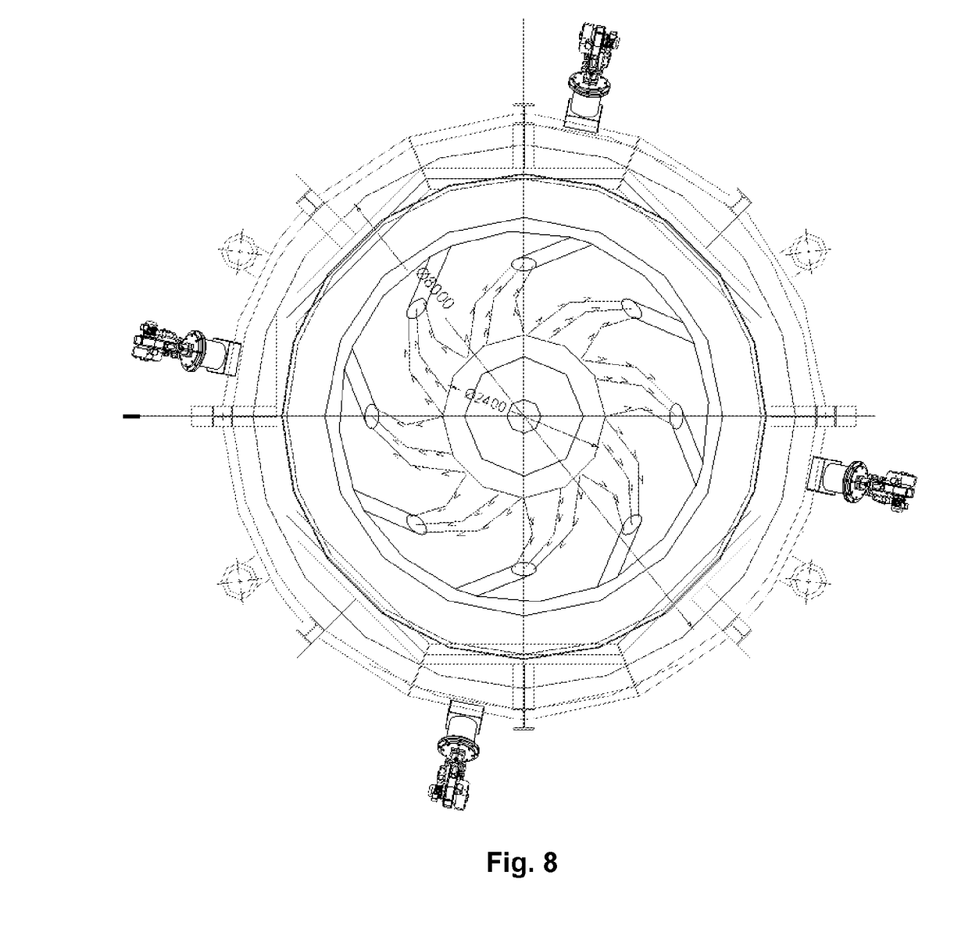
FIG. 8 shows a schematic top view of the device of FIG. 7.

With regard to FIGS. 7 and 8, they refer to a further embodiment which provides suction means 106 of a fluidizing gas, arranged within the casing 102 above the free surface 135 of the bed of particles 103, and in particular associated with the confinement structure, hereby indicated with 500.

Such means 106 comprise, in this example, one or more suction valves or nozzles arranged in line with a lateral skirt of the structure 500. In the embodied configuration, the latter does not provide the aforementioned descending conduit and ends above the free surface 135 of the bed 103. The presence of the nozzles prevents the fluidization gas conveyed through the second fluidization means 400 from leaking through the opening 200.

FIG. 7 also shows heat exchange elements 110, in particular tube bundles which, when in use, are crossed by an operating fluid and arranged at said portion of storage and/or exchange 131 of the bed of fluidizable particles. Obviously, said elements 110 are also provided in the other embodiments and variants described above.

As explained also before, the device 101, described when considering all the figures taken into consideration above, may also comprise inlet means of a confining gas, preferably air, above the free surface 135, configured to supply a laminar gas flow suitable to produce a barrier to the escape of particles towards the outside. Said means may also be implemented by means of the same valves or nozzles considered in FIG. 7.

As stated above, the device of the invention is suitable to work in conjunction with an optical system, the latter preferably having a "beam down" configuration which provides one or more primary optical elements arranged to the ground and one or more secondary reflection optical elements arranged in altitude. The optical system is configured to concentrate the solar radiation in line with the aforementioned irradiation opening.

The device of the invention features a modular nature, which is to say that adapts well to being linked to one or more analogous devices in series or in parallel with respect to the thermal exchange.

Moreover, the types of devices according to the various embodiments and embodiment variants that have been described can be favorably associated for greater production and/or operating flexibility of the industrial system.

The management of the energy production system shown as an example in FIG. 3 is preferably carried out by means of a control software that optimizes its operation on the basis of the requests of the user and/or of the meteorological conditions, with the result of obtaining a fully flexible operation of the system.

Once again, in a preferred configuration, the system based on one or more of the devices of the invention can be advantageously associated with a photovoltaic system that provides for the production of electric energy during the day and which compensates the consumption of the system auxiliaries. In this configuration, the accumulation and transfer devices can be managed under a regimen of accumulation of the thermal energy of solar origin during the hours of sunlight and then under a regime of thermal energy supply, transferring it to the operating fluid that passes through the internal exchangers to the bed of particles, for the production of electric energy, from dawn onwards.

Moreover, in the same configuration, the system can be associated with a desalination system or to another system for the exploitation of the thermal energy of solar origin. In such a case, the devices can be managed under a mixed regime: both using accumulation, for the nighttime production of electric energy, as well as using contemporaneous supply, dedicating the related supply of thermal energy to the continuous operation of the system, for example that of desalinization.

The device of the invention can be supplemented by systems powered by other renewable (for example, photovoltaic, wind, geothermal) or non-renewable energy sources to ensure the continuity of energy production for the purpose of decreasing or eliminating the production of energy generated from non-renewable sources.

In all of the embodiments and variants described above, the transmission of energy from the concentrated radiation to the fluidized bed is obtained through the granular material that becomes the primary vector of the thermal energy, unlike the traditional means of reception with a membrane or transparent window that, placing themselves between the concentrated energy and the correlated thermal vector, result in their physical separation.

The invention also provides a method for the accumulation and exchange of thermal energy of solar origin, based on the functionalities that have been described above in relation to the device and to the system of the invention.

The present invention has been described so far with reference to preferred embodiments. It is to be understood that other embodiments may exist which refer to the same inventive concept, as defined by the scope of protection of the claims reported below.

The invention claimed is:

1. A device adapted for accumulation and exchange of thermal energy of solar origin,
which device is configured to receive a solar radiation concentrated by an optical system, which device comprises:
a casing which defines an internal compartment and has an irradiation opening configured to allow entry of concentrated solar radiation, which irradiation opening puts in direct communication said inner compartment with external environment being devoid, in use, of closure or screen means;
a bed of fluidizable solid particles, received within said inner compartment of said casing, which bed has an operative region directly exposed, in use, to the concentrated solar radiation that enters through said irradiation opening, in such a way that the particles of said operative region absorb thermal energy from solar radiation; and
fluidization means of said bed of fluidizable solid particles, configured to adduce a fluidizing gas into said compartment at least at said operative region
wherein said casing has an inclined upper surface arranged above a free surface of said bed of fluidizable solid particles and having a bottom margin at or in proximity of said irradiation opening, the configuration being such that said inclined surface is such as to promote a suction effect of the fluidization gas that emerges from the bed of fluidizable solid particles, wherein said irradiation opening is defined at said inclined upper surface.

2. The device according to claim 1, wherein said irradiation opening is arranged in a lateral or decentralized position on said casing, in particular laterally with respect to said operative region, at a top wall or a lateral skirt of said casing.

3. The device according to claim 2, wherein said irradiation opening is defined at an inclined portion at said lateral skirt of said casing.

4. The device according to claim 1, wherein the arrangement is such that a view factor of said irradiation opening with respect to the free surface of said operative region is lower than 1.

5. The device according to claim 1, wherein said fluidization means comprises one or more feeding elements of fluidizing gas accessible or inspectable from the outside of said device, without the need for removing the bed of fluidizable solid particles.

6. The device according to claim 1, wherein said fluidization means are configured to determine at least two different fluidization speeds within said bed of fluidizable solid particles.

7. The device according to claim 1, wherein said fluidization means are configured to determine a circulatory convective motion of particles within said bed of fluidizable solid particles.

8. The device according to claim 1, wherein said fluidization means are configured to determine a fluidization regimen of a spouted type in said operative region.

9. The device according to claim 1, wherein said bed of fluidizable solid particles has a heat storage region adjacent to said operative region, the overall configuration being such that, particles of said operative region absorb thermal energy from solar radiation and transfer it to particles of said storage region.

10. The device according to claim 1, comprising suction means of fluidizing gas, arranged within said casing above a free surface of said bed of fluidizable solid particles.

11. The device according to claim 10, comprising heat exchange means between the fluidizing gas in input to said casing by means of said fluidization means and the fluidizing gas exiting from said casing through said suction means.

12. The device according to claim 10, wherein said suction means are configured to extract from the device a flow of fluidization gas equal to or higher than a flow rate of fluidizing gas fed into said bed of fluidizable solid particles by said fluidization means.

13. The device according to claim 10, wherein said suction means are configured to cause a depression at a vacant space interposed between a free surface of the bed of fluidizable solid particles and an upper part of said casing.

14. The device according to claim 13, comprising a shaped confinement structure, configured to contain particles of said bed of fluidizable solid particles within said casing, which confinement structure is arranged at said irradiation opening.

15. The device according to claim 1, comprising auxiliary heat exchange means positioned so as to be directly irradiated by solar radiation and arranged at or near said irradiation opening.

16. The device according to claim 15, comprising heat exchange elements arranged within said bed of fluidizable solid particles and crossed by an operating fluid, wherein said auxiliary heat exchange means are connected to said heat exchange elements.

17. The device according to claim 1, wherein said bed of fluidizable solid particles has a heat storage region adjacent to said operative region and in dynamic communication of particles with said operative region, which device comprises:
fluidization means of said operative region, comprising an ascending conduit arranged longitudinally within said bed of fluidizable solid particles and extending at least up to a free surface of said bed, which ascending conduit is configured to guide the particles of said operative region up to a bubbling or eruption above said free surface and at said irradiation opening;
a confinement structure, fixed with said casing and positioned at said irradiation opening, which confinement structure is arranged circumscribed to said ascending conduit and has a descending conduit extending within said bed of fluidizable solid particles to guide the particles of the operative region, downstream of said bubbling or eruption, in a motion of re-admission into the heat storage region.

18. The device according to claim 17, wherein said confinement structure defines, above the free surface of said bed of fluidizable solid particles, a plenum chamber of the fluidization motion of the particles of said heat storage region.

19. The device according to claim 17, in which said fluidization means are configured to determine a regimen of boiling bed in said bed of fluidizable solid particles or regions thereof.

20. The device according to claim 17, comprising suction means of a fluidizing gas, arranged within said casing above a free surface of said bed of fluidizable solid particles.

21. The device according to claim 17, comprising inlet means of a confining gas, arranged within said casing above the free surface of said of fluidizable solid particles bed, which inlet means are configured to supply a laminar gas flow suitable to produce a barrier to the escape of particles towards the outside.

* * * * *